US006662087B1

(12) United States Patent
Liebl et al.

(10) Patent No.: US 6,662,087 B1

(45) Date of Patent: Dec. 9, 2003

(54) BACKWARD COMPATIBLE DIAGNOSTIC TOOL

(75) Inventors: Troy J. Liebl, Owatonna, MN (US); Kurt R. Raichle, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/476,911

(22) Filed: Jan. 3, 2000

(51) Int. Cl.[7] ......................... G01M 17/00; G05D 1/00; G06F 15/00; G06F 7/38

(52) U.S. Cl. ............................. 701/29; 701/31; 701/32; 701/33; 703/23; 703/26; 703/27; 712/210; 712/227

(58) Field of Search .............................. 701/29, 33, 31, 701/32; 703/23, 26, 27; 712/210, 227

(56) References Cited

U.S. PATENT DOCUMENTS

| | | | | |
|---|---|---|---|---|
| 4,694,408 A | | 9/1987 | Zaleski | |
| 4,739,323 A | | 4/1988 | Miesterfeld et al. | 340/825.5 |
| 4,771,376 A | * | 9/1988 | Kamiya | 703/27 |
| 4,962,456 A | | 10/1990 | Abe et al. | |
| 4,975,846 A | | 12/1990 | Abe et al. | |
| 4,975,847 A | | 12/1990 | Abe et al. | |
| 5,003,477 A | | 3/1991 | Abe et al. | |
| 5,056,023 A | | 10/1991 | Abe | |
| 5,132,905 A | | 7/1992 | Takai et al. | |
| 5,150,048 A | | 9/1992 | McAuliffe et al. | |
| 5,319,962 A | | 6/1994 | Kaminski et al. | 73/116 |
| 5,416,917 A | | 5/1995 | Adair et al. | 395/500 |
| 5,459,660 A | | 10/1995 | Berra | |
| 5,555,498 A | | 9/1996 | Berra et al. | |
| 5,581,462 A | | 12/1996 | Rogers | |
| 5,692,159 A | * | 11/1997 | Shand | 703/27 |
| 5,737,711 A | | 4/1998 | Abe | 701/29 |
| 5,740,461 A | * | 4/1998 | Jagger | 712/41 |
| 5,790,965 A | * | 8/1998 | Abe | 701/29 |
| 5,881,258 A | * | 3/1999 | Arya | 712/209 |
| 5,898,846 A | * | 4/1999 | Kelly | 710/104 |

FOREIGN PATENT DOCUMENTS

| | | |
|---|---|---|
| JP | 1210844 | 8/1989 |
| JP | 3111733 | 5/1991 |
| JP | 8136411 | 5/1996 |

* cited by examiner

*Primary Examiner*—Yonel Beaulieu
*Assistant Examiner*—Brian J Broadhead
(74) *Attorney, Agent, or Firm*—Baker & Hostetler LLP

(57) ABSTRACT

A test instrument includes a cartridge adapter for receiving existing vehicle diagnostic cartridges programmed for use with an 8-bit microprocessor. The adapter is coupled to a field programmable gate array (FPGA), which is programmed to emulate the operation of the 8-bit microprocessor and supply information to a 32-bit microprocessor coupled to a display and control panel to emulate the operation of a system for which the cartridges have been programmed. Additionally, the 32-bit microprocessor includes programming for new vehicles as well as the ability to read and store updated vehicle information through flash memory to be continuously updated.

20 Claims, 2 Drawing Sheets

BACKWARD COMPATIBLE DIAGNOSTIC TOOL

BACKGROUND OF THE INVENTION

The present invention relates to a diagnostic tool for use in connection with diagnosing vehicle systems and particularly a diagnostic tool which accommodates different format storage mediums.

For many years, electrical testers have been provided for connection to a vehicle's computer system through a test port which is a connector allowing the test equipment to interrogate and diagnose vehicle systems for maintenance and servicing. Such systems include, for example, an engine mounted control module, a heating ventilation and air conditioning module (HVAC), an instrument panel cluster and the like. Different vehicle manufacturer's utilize different communication protocols and as vehicle models change, each vehicle has its own signal parameters representative of normal or abnormal conditions within the vehicle. Thus, with the thousands of vehicles now including test ports, several using different communication protocols and each with their own signals, it is necessary to provide stored data for controlling testers employed for the servicing of vehicles which store the test data for each vehicle model and year as well as provide a communication protocol which allows the tester to communicate with a given vehicle under service.

Several hundred thousand testers have, in the past, employed an 8-bit microprocessor, such as a Motorola 6803, as the microprocessor for processing data. Each tester can employ numerous memory cartridges which include stored data and control information for the vehicles. As can be appreciated, with the hundreds of thousands of testers in the market and the numerous cartridges for each tester and as additional vehicles are included, replacing the somewhat outdated 8-bit microprocessor with a new system would require reprogramming of the data contained by all of the existing cartridges for use with the 8-bit microprocessor as well as obsoleting the service cartridges now available to the service technicians. As vehicles become older, their cartridges gradually become obsolete and to program a new microprocessor system with all such information would consume memory that is better used for current and new vehicles with which a tester is to be employed.

As a result, it is desirable to provide an improved tester with faster processing capabilities, improved memory and yet one which will allow the use of existent cartridges for older vehicles using the earlier microprocessor platform.

SUMMARY OF THE INVENTION

The system of the present invention accommodates this need by providing a cartridge adapter for receiving existing vehicle diagnostic cartridges programmed for use with an 8-bit microprocessor. The adapter receives existing cartridges and is coupled to a field programmable gate array (FPGA) programmed to emulate the operation of the 8-bit microprocessor, such as a Motorola 6803, and supplies information to a 32-bit microprocessor coupled to a display and control panel to emulate the operation of a system for which the cartridges have been programmed. Additionally, the 32-bit microprocessor includes programming for new vehicles as well as the ability to use updated vehicle information through flash memory to be continuously updated. A second FPGA provides a communication interface between the vehicle input/output circuit for providing communication using the various protocols employed by different vehicle manufacturers.

With such a system, therefore, existent cartridges for earlier vehicles can be employed and testing conducted by field technicians in the same manner as they have been accustomed to while using a tester which is programmed for use with newer vehicles such that service personnel can service all vehicles utilizing familiar testing techniques for earlier vehicles as well as a higher speed, more efficient microprocessor for both older vehicles and new vehicles.

These and other features, objects and advantages of the present invention will become apparent upon reading the following description thereof together with reference to the accompanying drawings.

DETAILED DESCRIPTION OF THE PREFERRED EMBODIMENT

Figure 1:
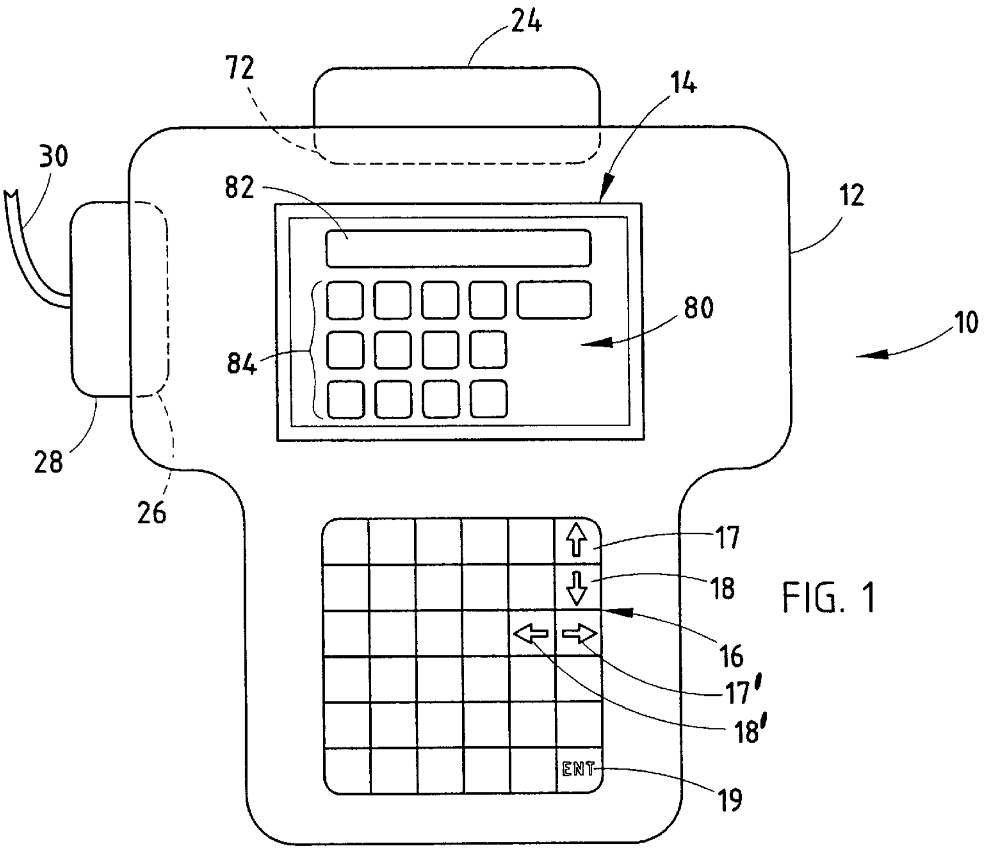
FIG. 1 is a front elevational view of a test instrument embodying the present invention.

Referring initially to FIG. 1, there is shown a test instrument 10 embodying the present invention and which has a relatively compact housing 12 with an enlarged upper section for accommodating a 320 by 240 pixel liquid crystal display (LCD) 14. Display 14 emulates not only the 4 by 20 pixel display of the earlier test instruments sold by the assignee of the present invention as a Monitor 4000 instrument but also emulates the keypad of the Monitor 4000 instrument for allowing the operator to utilize instrument 10, as described below, in the same manner as the earlier test instrument was employed. Thus, use of instrument 10 by field service personnel draws upon the familiarity of the service personnel with the earlier test instrument and employs the existing cartridges storing vehicle data information for existing vehicles. As used herein the term "data" also includes vehicle system information from the vehicle and communication to the vehicle (e.g., codes, messages, commands, instructions and requests). In addition, the term "language", as used herein, includes instructions, codes or sets.

Housing 12 is ergonomically designed to be easily handheld and includes a keypad 16 for the entry of displayed data once selected by utilization of cursor keys 17, 17', 18 and 18' and the actuation of an entry switch 19. Housing 12 includes a socket 22 on the back side of the instrument for receiving memory cartridges 24 for controlling the instrument to communicate with vehicles under test. Cartridges 24 are the same cartridges as exist for use in connection with the Monitor 4000 system and typically will include data for a given vehicle make and series of such vehicle models for a period of time, such as four to six years as only one example. In addition, the test instrument 10 includes a flash memory socket 25 for receiving updated data for new vehicles stored in a flash memory chip. A socket 26 receives a connector 28 coupled to a wire harness 30 which, in turn, includes a plug on the opposite end (not shown) selected for a given vehicle for plugging into the vehicle's test socket to interface the test instrument 10 with the vehicle's computer. Wire harness 30 may also include a power plug allowing an instrument to be plugged into the vehicle's electrical system through a conventional cigarette lighter plug.

Figure 2:
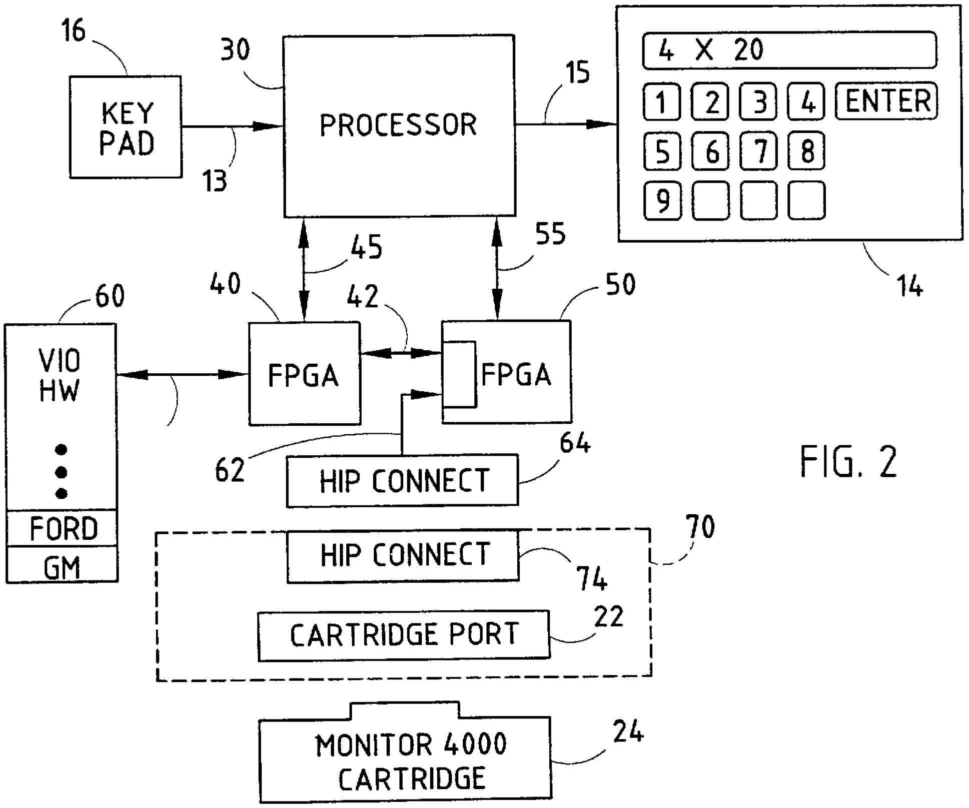
FIG. 2 is a block and schematic electrical circuit diagram of the tester shown in FIG. 1.

The heart of the test instrument, as seen with reference to FIG. 2, is a 32-bit microprocessor 30 comprising, in the preferred embodiment, an integrated microprocessor and peripheral circuit on a single chip which includes a universal serial bus (USB) interface, a video display controller, and a LCD controller. In the preferred embodiment, a Motorola MPC 823 microprocessor is employed and is coupled to the display 14 through bus 15. The microprocessor receives input command control signals from keypad 16 through interface bus 13 and is coupled to a pair of field programmable gate arrays (FPGAs) 40 and 50 through data address lines 45 and 55, respectively. FPGA 40 and FPGA 50 in the preferred embodiment are model 10K50E circuits made by Altera, although other FPGAs or other programmable circuits can be employed. For example, FPGAs 40 and 50 can be replaced with application specific integrated circuits (ASICs).

FPGAs 40 and 50 are coupled to one another by a 16-bit parallel communication link 42. FPGA 40 is programmed to communicate with the vehicle input/output interface circuit 60 such that for any given vehicle, such as, for example, Chrysler, Ford or General Motors, the data protocol allows communication between the test instrument 10 and the vehicle under test. FPGA 50 is also coupled to a hip connector socket 64 through bus 62 for receiving control information from a cartridge 24, which is coupled to FPGA 50 through a cartridge adapter circuit 70. Circuit 70 includes an eight data line adapter, a serial universal asynchronous receiver transmitter (UART) and memory allowing the FPGA 50 to read data from the cartridge 24, which is plugged into a cartridge port 22 in adapter 70, which has a hip plug 74 which is connected to hip connector 64 for interconnecting the adapter to the test instrument 10 and the cartridge 24 to adapter 70. Thus, cartridge 24 is coupled to microprocessor 30 through FPGA 50. FPGA 50 is programmed to emulate the earlier 6803 microprocessor for which the existent cartridges 24 are programmed. FPGAs 40 and 50 can be conventionally programmed to emulate the 6803 microprocessor core as well as the protocols for use with different vehicles. One of skill in the art will appreciate that the present invention could utilize a microprocessor, other than a 32-bit microprocessor (e.g., a 64-bit microprocessor), in combination with an emulated legacy microprocessor (e.g., 8-bit or 16-bit microprocessor).

Figure 3:
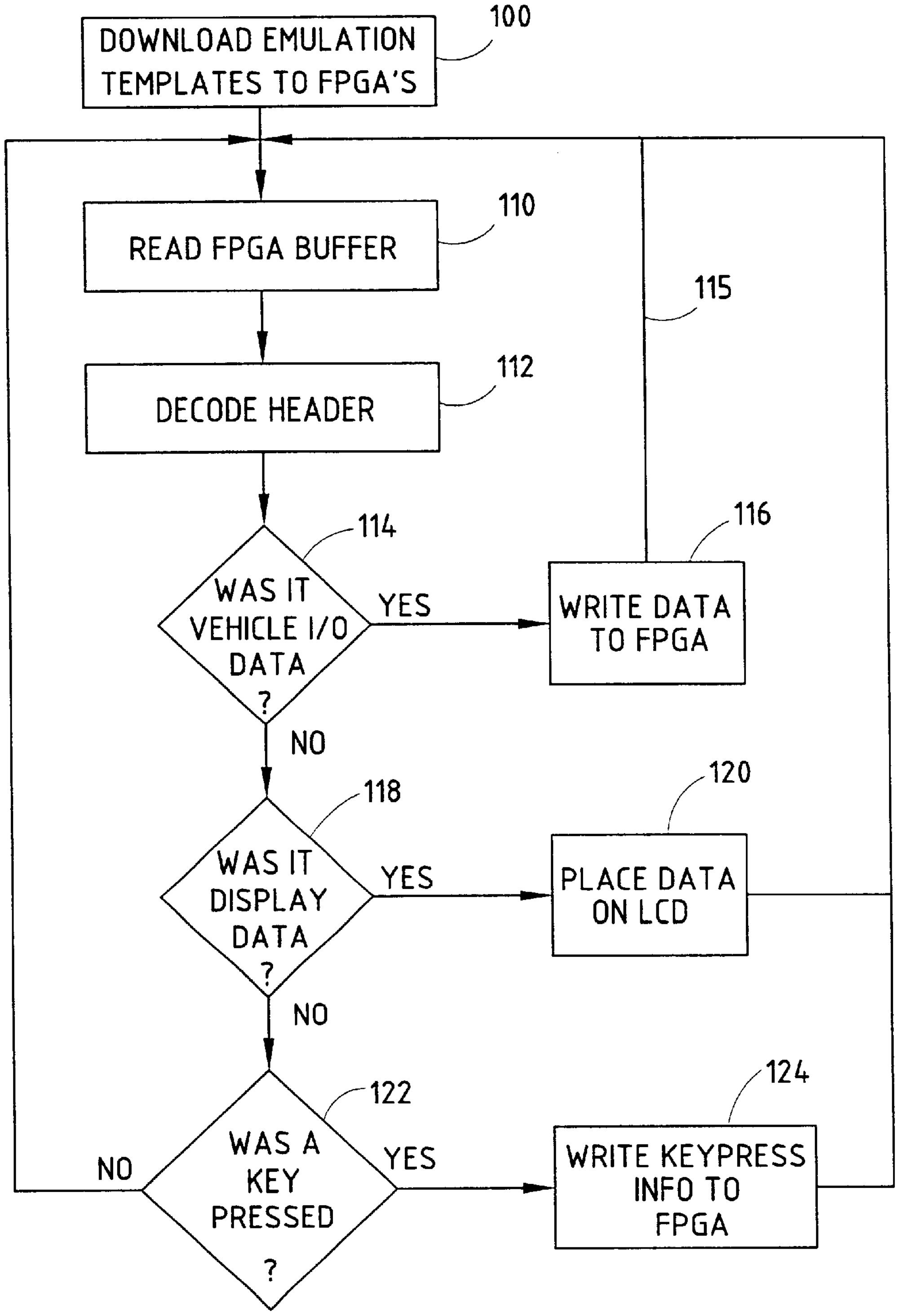
FIG. 3 is a flow diagram of the software employed to read and control data from a plug-in cartridge.

When instrument 10 is employed with existing cartridges, the FPGAs 40, 50 are programmed as indicated by block 100 in FIG. 3, as noted above, with the emulation templates for the 6803 microprocessor as well as the vehicle input/output protocols employed with the different vehicles. When the service technician powers up the test instrument, a main menu on display 14 prompts the technician to select "Monitor 4000 emulation" and, if a vehicle being serviced is covered by an existent program cartridge, the technician selects this operation by highlighting the selection using cursors 17, 17', 18, and 18' and actuating an entry command via switch 19. When the test instrument is connected to the vehicle and the proper cartridge 24, the instrument reads vehicle data from the FPGA 50 buffer, as indicated by block 110, to initially decode the data header, as indicated by block 112, and determines in block 114 whether it was input/output (I/O) data. If it is I/O data, the data is written to FPGA 50, as indicated by block 116, and processed according to the existent coding information on cartridge 24. As the vehicle data is received and processed, it will provide the vehicle operator with output display data and, as the program loops through the path including line 115, the vehicle data will become display data which is tested at block 118 and, if it is, it will be sent via bus 15 to LCD 14 as indicated by block 120. If the data was neither I/O data nor display data, it is further tested as indicated in block 122 to determine whether it is input data from keypad 16. If it was, the key stroke information is decoded and applied to the buffer of FPGA 50 as indicated by block 124 which responds to the data to provide a control signal to the system for responding to the operator-entered signal.

FPGA 50 is programmed to provide a display 80 (FIG. 1) on the LCD 14 which emulates the previous Monitor 4000 test instrument. Thus, LCD 14 provides a 4 by 20 pixel display panel 82 corresponding to the LCD of a Monitor 4000 instrument. Below the emulated LCD 82 is an emulated keypad 84 including numeric keypads and an enter switch which can be highlighted by the operator by actuating cursor controls 17, 18 and 17', 18'. Once the key switch desired is highlighted, the enter switch 19 is actuated by the operator to enter the command indicated by the emulated Monitor 4000 display 80. Thus, instrument 10 allows operation which mimics exactly the operation of an existing test instrument utilizing existing cartridges 24 in addition to its independent operation, without the use of a cartridge 24, for newer vehicles through the direct programming of microprocessor 30. By providing an emulation of the earlier microprocessor, the ability to use thousands of existing cartridges 24 with memory for controlling the instrument can be employed and familiar testing techniques employed by the service personnel utilizing an updated instrument which can recognize not only existing program cartridges but also diagnostic programs for newer vehicles as well as receive additional programming information through the use of a faster 32-bit microprocessor.

It will become apparent to those skilled in the art that various modifications to the preferred embodiment of the invention as described herein can be made without departing from the spirit or scope of the invention as defined by the appended claims.

The invention claimed is:

1. An updated automotive test instrument that operates in an established manner with existing, new or updated data, said established manner is derived from prior use with a cartridge, comprising:

an input port for receiving the cartridge programmed with vehicle data;

a first processor coupled to said input port;

a display coupled to said first microprocessor for providing a familiarized output to a user;

an input device coupled to said first microprocessor for receiving input from a user; and a programmable circuit coupled to said first microprocessor and emulating a second microprocessor for translating vehicle data from the cartridge for use with said emulated second microprocessor to control said emulated second processor, wherein said first microprocessor processes more bits in a single instruction than said emulated second microprocessor;

wherein the established manner is a legacy input device for operating a legacy automotive test instrument.

2. The instrument as defined in claim 1 wherein said programmable circuit comprises a first field programmable gate array (FPGA).

3. The instrument as defined in claim 2, further including:

a second FPGA coupled to said first microprocessor; and a vehicle input/output interface circuit coupled to said second FPGA for coupling said first microprocessor to a vehicle under test.

4. The instrument as defined in claim 1, wherein said first microprocessor is a 32-bit microprocessor.

5. The instrument as defined in claim 1, wherein said display is a liquid crystal display (LCD).

6. The instrument as defined in claim 1, further including a cartridge adapter coupled between said input port and said cartridge.

7. An automotive test instrument comprising:

an input port for receiving a cartridge programmed with vehicle data information;

a first microprocessor coupled to said input port;

a display coupled to said first microprocessor for providing output to a user;

an input device coupled to said first microprocessor for receiving input from the user;

a programmable circuit coupled to said first microprocessor and emulating a second microprocessor for translating vehicle data information from a cartridge for use with said emulated second microprocessor to control said emulated second microprocessor, wherein a display area within said display is utilized for emulating a legacy input device for operating a legacy automotive test instrument.

8. An updated automotive test instrument that operates in an established manner with existing, new or updated data, said established manner is derived from prior use with a cartridge, comprising:

a housing an input port for receiving the cartridge programmed with vehicle data information for use with an 8-bit processor;

a first processor coupled to said input port, wherein said first processor is a 32-bit processor;

a display contained within said housing, said display coupled to said first microprocessor for providing output in the established manner;

an input device mounted to said housing, said input device coupled to said first microprocessor for receiving input from a user; and a programmable circuit coupled to said first microprocessor and emulating a second microprocessor for translating vehicle data information from the cartridge for use with said emulated second processor to control said emulated second microprocessor, wherein said emulated second processor is an 8-bit microprocessor;

wherein said established manner is a legacy input device for operating a legacy test instrument.

9. The instrument as defined in claim 8, wherein said programmable circuit is a first field programmable gate array (FPGA).

10. The instrument as defined in claim 9, further including:

a second FPGA coupled to said first microprocessor; and a vehicle input/output interface circuit coupling said second FPGA to a vehicle under test.

11. The instrument as defined in claim 10, wherein said second FPGA is programmed to recognize different vehicle communication protocols.

12. The instrument as defined in claim 8, wherein said display is a liquid crystal display (LCD).

13. A method of employing memory cartridges having a first predetermined format with a vehicle test instrument for analyzing vehicle system information using a second predetermined format different than the first predetermined format said vehicle test instrument operates in an established manner with existing, new or updated data, said manner is derived from prior use with the cartridge comprising:

inserting a memory cartridge into an input port;

reading vehicle data information from the memory cartridge in the first predetermined format;

translating the read vehicle data information into the second predetermined format;

processing the read vehicle data information using a second microprocessor;

coupling the second microprocessor to a vehicle for analyzing transmitted vehicle system information and comparing such information with established system parameters within the cartridge; and displaying one of the comparison results and the vehicle system information in said established manner, wherein said established manner is a legacy input device for operating a legacy test instrument.

14. The method as defined in claim 13, wherein said translating step includes the steps of:

storing the core of a first microprocessor with said first predetermined format in a programmable circuit; and supplying said read vehicle data information to said programmable circuit.

15. The method as defined in claim 14, wherein said programmable circuit is a field programmable gate array (FPGA).

16. An automotive test instrument that operates in an established manner with existing, new, or updated data, said established manner is derived from prior use with a cartridge, comprising:

an input port for receiving the cartridge programmed with established vehicle parameters stored in a first format;

a microprocessor coupled to said input port;

an interface circuit coupled to said microprocessor for coupling said microprocessor to a vehicle for transferring data between the vehicle and said microprocessor; and a programmable circuit coupled to said microprocessor and to said input port for translating information on the cartridge to a second format recognized as an input language by said microprocessor;

wherein said established manner is a legacy input device for operating a legacy test instrument.

17. The instrument as defined in claim 16, wherein said programmable circuit is a field programmable gate array (FPGA).

18. The instrument as defined in claim 17, wherein said interface circuit includes a second FPGA coupled to said microprocessor for providing different communication protocols for said microprocessor to communicate with a vehicle under test.

19. The instrument as defined in claim 18, wherein said microprocessor is at least a 32-bit microprocessor.

20. The instrument as defined in claim 19, further including a liquid crystal display (LCD).

* * * * *